United States Patent
Gerber et al.

(10) Patent No.: US 8,484,740 B2
(45) Date of Patent: Jul. 9, 2013

(54) PRIORITIZING MALICIOUS WEBSITE DETECTION

(75) Inventors: Alexandre Gerber, Madison, NJ (US); Christopher Dunn, Bloomington, IN (US); Minaxi Gupta, Madison, IN (US); Oliver Spatscheck, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 328 days.

(21) Appl. No.: 12/877,639

(22) Filed: Sep. 8, 2010

(65) Prior Publication Data

US 2012/0060221 A1   Mar. 8, 2012

(51) Int. Cl.
*G06F 11/36* (2006.01)

(52) U.S. Cl.
USPC .......... 726/25; 726/23; 726/24; 709/206; 709/224; 707/709

(58) Field of Classification Search
USPC .......... 726/23–25; 709/206, 224; 707/709
See application file for complete search history.

(56) References Cited

U.S. PATENT DOCUMENTS

| | | | |
|---|---|---|---|
| 7,676,217 B2 | 3/2010 | Zhu et al. | |
| 7,827,311 B2 * | 11/2010 | Cooley et al. | 709/245 |
| 7,890,996 B1 * | 2/2011 | Chauhan et al. | 726/13 |
| 2003/0140140 A1 | 7/2003 | Lahtinen | |
| 2006/0069697 A1 * | 3/2006 | Shraim et al. | 707/102 |
| 2006/0161986 A1 | 7/2006 | Singh et al. | |
| 2007/0136806 A1 | 6/2007 | Berman | |
| 2008/0010368 A1 | 1/2008 | Hubbard et al. | |
| 2008/0010683 A1 | 1/2008 | Baddour et al. | |
| 2008/0133540 A1 * | 6/2008 | Hubbard et al. | 707/10 |

* cited by examiner

*Primary Examiner* — Andrew Georgandellis
(74) *Attorney, Agent, or Firm* — Akerman Senterfitt; Michael K. Dixon; Roy Zachariah

(57) ABSTRACT

A computer implemented method includes identifying a universal resource locator and characterizing a traffic pattern associated with the universal resource locator. The traffic pattern can include referrer information, referring information, advertising network relationship information, and any combination thereof. The method can further include classifying the universal resource locator into a risk category based on the traffic pattern.

10 Claims, 6 Drawing Sheets

PRIORITIZING MALICIOUS WEBSITE DETECTION

FIELD OF THE DISCLOSURE

The present disclosure generally relates to communications networks, and more particularly relates to prioritizing malicious website detection.

BACKGROUND

Packet-switched networks, such as networks based on the TCP/IP protocol suite, can distribute a rich array of digital content to a variety of client applications. One popular application is a personal computer browser for interacting with websites. Websites can provide ways to obtain information, perform transactions, and communicate with others. However, some websites have a malicious intent, such as propagating malicious programs and phishing to obtain personal and financial information. Identifying malicious universal resource locators (URLs) out of the billions of URLs visited by users and protecting users from the malicious websites continues to be a challenge.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
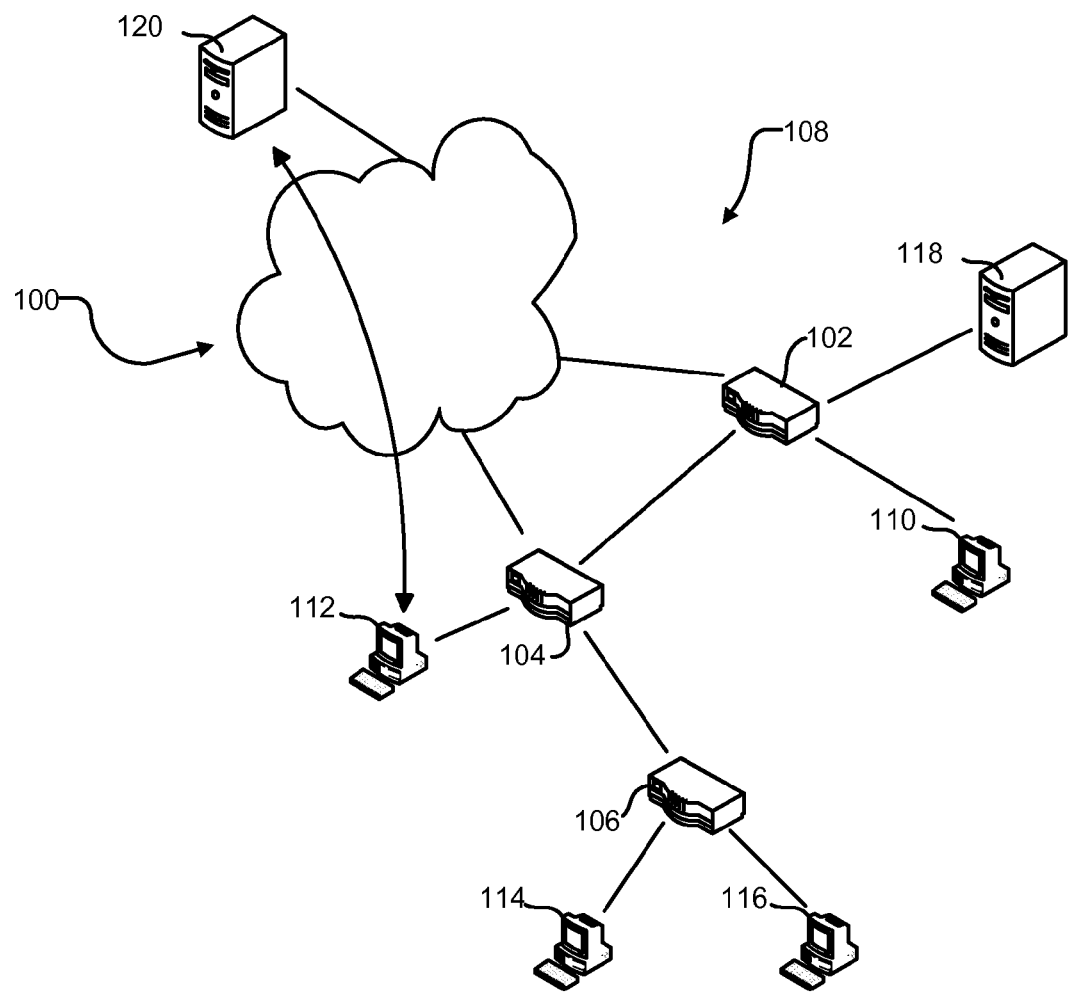
FIG. 1 is a block diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120.

In an embodiment, server 120 may provide malicious content, including malicious software, such as computer viruses and worms, and phishing sites attempting to obtain personal and financial information. While it may be preferable to avoid the malicious content, it can be difficult for a user to distinguish between a URL with legitimate content and a URL with malicious content. Once malicious content is detected, systems including firewalls, web proxies, and other means can be used to inform the user of malicious content. These systems can be implemented at client systems 110, 112, 114, and 116, at routers 102, 104, and 106, and at other locations within the network.

Figure 2:
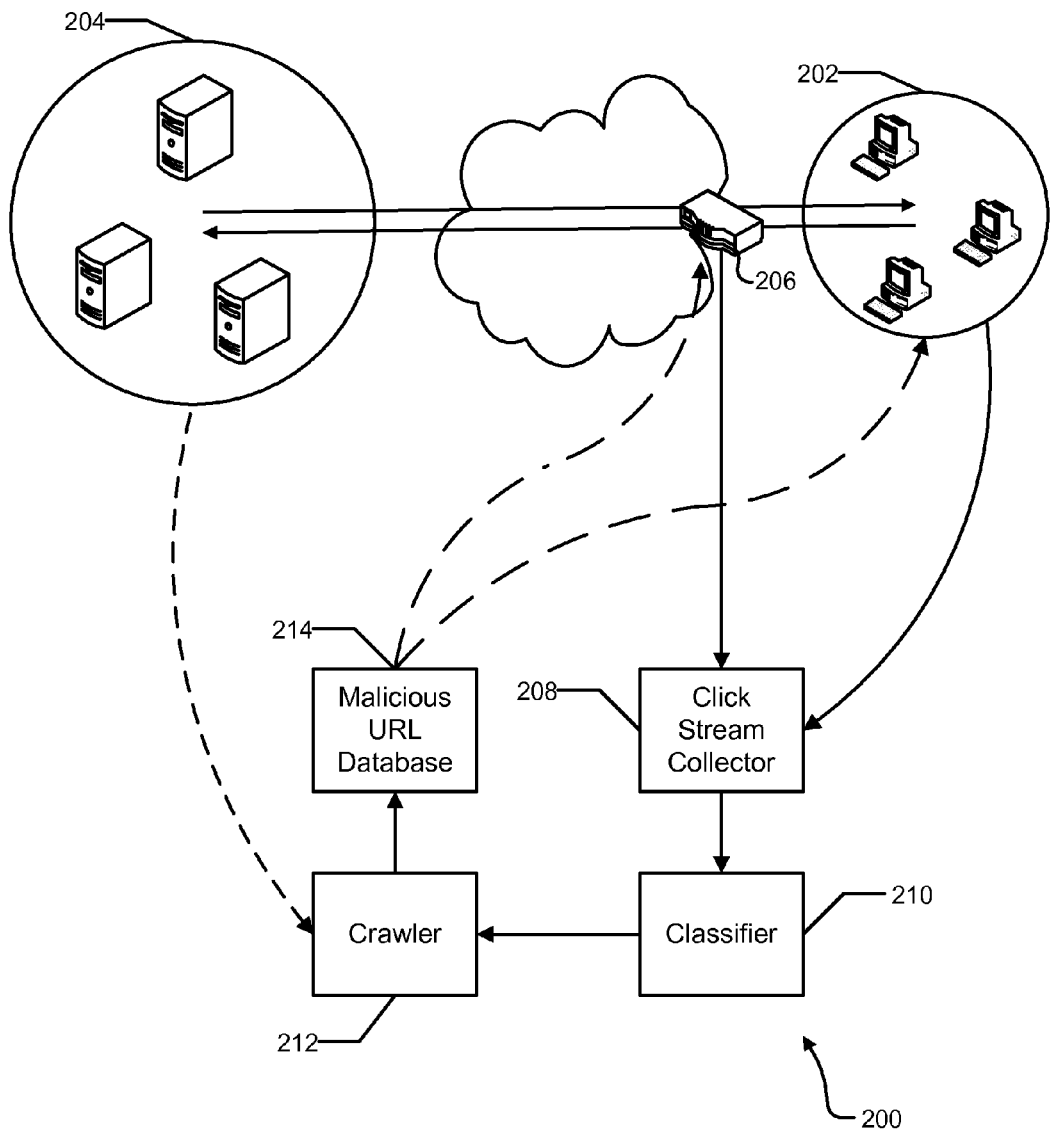
FIG. 2 is a block diagram illustrating a system for identifying malicious URLs in accordance with one embodiment of the present disclosure.

FIG. 2 illustrates a system 200 for identifying malicious URLs that can be used in conjunction with communications network 100. Client systems 202 can request content from servers 204. The requests and content can pass through a network device 206, such as a router or firewall. System 200 can include a click stream collector 208, a classifier 210, a crawler 212, and a malicious URL database 214.

In an embodiment, network device 206 can collect the click stream data of client systems 202 and provide the click stream data to click stream collector 208. The click stream data can include the pattern of URLs visited by each client system. In an alternative embodiment, client systems 202 can provide click stream data directly to click stream collector 208. The click stream data can include the identity of each URL visited and, when available, the referrer URL that directed a user to the URL. Additionally, when available, the click stream data can include the identity of a referred URL to which the URL directs a user.

Click stream collector 208 can aggregate the click stream data from a plurality of client systems 202 to identify the URLs accessed by the client systems 202. Additionally, the click stream collector 208 can collect additional information about the URLs, such as if the host is well connected, if the host is unpopular, if the URL is part of an advertising network, or any combination thereof. In an embodiment, the host can be well connected if the host is indexed by a search engine. In another embodiment, the host can be unpopular if the number of visits to the host over a period of time is below a threshold. The click stream collector 208 can provide the URL information to the classifier 210.

The classifier 210 can classify each URL based on the URL information provided by the click stream collector 208. For example, the classifier can classify each URL based on information about the referring URL, such as if there is no referring URL, if the referring host is unpopular, if the referring host is well connected, if the referrer is part of an ad network, or any combination thereof. Additionally, the classifier can classify each URL based on information about the URL, such as if the URL includes an IP address as the host name, if the host is unpopular, if the host is well connected, if the URL refers to an image, if the URL is never a referrer, if the URL is part of an ad network, or any combination thereof. Further, the classifier can classify each URL based on information about the referred URL, such as if the referred host is unpopular, if the referred host is well connected, or any combination thereof. The classifier 210 can provide the URLs grouped by classification to the crawler 212.

The crawler 212 can obtain the content associated with each URL and analyze the content to determine if the content is malicious. For example, the crawler 212 can run an antivirus program on the content to determine if the content contains malware. Alternatively, the content can be loaded and/or operated in a sandbox such that the action of the content can be monitored without affecting the crawler 212. In another example, the content can be analyzed to determine if the URL directs a user to a phishing site to deceptively obtain personal or financial information. Additionally, the crawler 212 can keep track of previously analyzed URLs to avoid analyzing the content of a URL multiple times.

In an embodiment, the crawler 212 can prioritize which URLs to process based on the classification provided by the classifier 210. For example, the crawler 212 can process the URLs in a group with the highest probability of being malicious prior to processing URLs in a group with the lowest probability of being malicious. In another embodiment, the crawler 212 can process a portion of the URLs from each group concurrently, with the number of URLs from each group being weighted by the probability of a URL in the group being malicious. For example, the crawler 212 can process twice as many URLs from a group with a two times greater probability of a URL being malicious.

When the crawler 212 identifies a URL as being malicious, the crawler 212 can provide the URL to the malicious URL database 214. The malicious URL database can provide the identities of the malicious URLs to various devices, such as the network device 206 or user systems 202, in the network to warn or substantially prevent users from accessing malicious URLs. The network device 206 or user systems 202 may then substantially block access to URLs found within the malicious URL database. Alternatively, the network device 206 or user systems may provide a warning to the user that the URL they are about to access may contain malicious content. Additionally, the malicious URLs can be provided to an email filter, enabling the email filter to identify emails containing malicious URLs as potential spam or malicious email.

Figure 3:
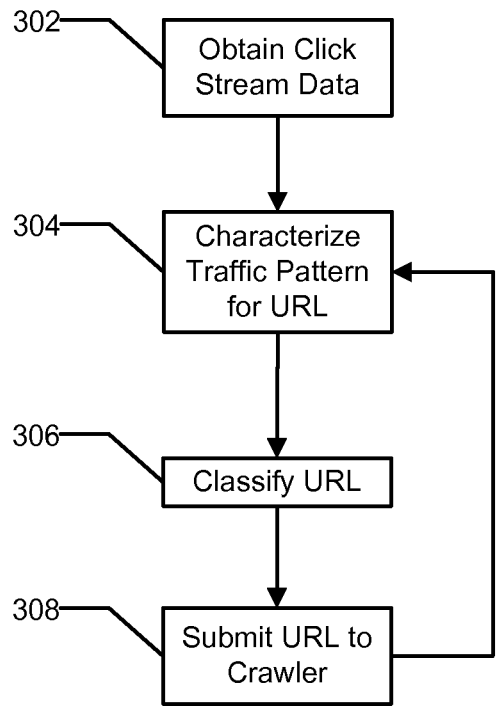
FIG. 3 is a flow diagram illustrating an exemplary method of classifying URLs based on a traffic pattern associated with the URL.

FIG. 3 illustrates an exemplary method of classifying URLs. At 302, the system can obtain click stream data for a number of users. In an embodiment, the click stream data can be anonymized, such that information identifying the users, such as the IP address of the user system, is not included in the click stream data.

At 304, the system can characterize the traffic pattern for each visited URL. For example, the traffic pattern for the URL can be characterized by information about the referring URL, information about the URL, information about the referred URL, or any combination thereof.

In an embodiment, information about the referring URL can include connectivity information, popularity information, or any combination thereof. The connectivity information about the referring URL can include the absence of a referring URL, the referring URL is an advertisement network, and the referring domain has many referrers, or any combination thereof. The popularity information about the referring URL can include an indication that the referring host is unpopular, an indication that the referring host is indexed by a search engine, or any combination thereof. A host can be considered unpopular when the number of visits to the host by the client systems is below a threshold.

In another embodiment, information about the URL can include connectivity information, popularity information, white list information, or any combination thereof. The connectivity information about the URL can include an indication that the URL is part of an advertisement network, an indication that a domain associated with the URL has many referrers, or any combination thereof. The popularity information about the URL can include an indication that the host is unpopular, an indication that the host is indexed by a search engine, or any combination thereof. The white list information about the URL can include indicators that the URL belongs to a class that is unlikely to be malicious. For example, images, image and script providers, content distribution networks, automatic update and certificate authorities, social networks, URLs that contain "crossdomain.xml" or "favicon.ico," and URLs that use an IP address instead of a hostname can be considered safe.

Images, crossdomain.xml, and favicon.ico are non-executable and therefore unlikely to include malware. Content delivery networks, sites providing automatic updates for well-known software, and certificate authorities also are unlikely to be malicious. While it is possible for social networks to direct users to malicious URLs, the social networks generally do not directly provide malicious software and other heuristics are generally capable of identifying the malicious URLs that users may be directed to from social networks. While the use of an IP address as a hostname in a URL has been considered an indicator of malicious URLs, many social networking applications utilize IP addresses as the hostname, indicating that URLs containing IP address as the hostname can be unlikely to contain malicious content.

In a further embodiment, information about the referred URL can include connectivity information, popularity information, or any combination thereof. An example of connectivity information about the referred URL can include an indication that the URL is never a referrer. The popularity information about the referred URL can include an indication that the referred host is unpopular, an indication that the referred host is indexed by a search engine, or any combination thereof.

At 306, the URL can be assigned a classification based on the characterization of the traffic pattern. The classification can be based on multiple aspects of the traffic pattern, such as a combination of information about the referring URL, the URL, and the referred URL. At 308, the URL, along with the classification, can be provided to a crawler.

Figure 4:
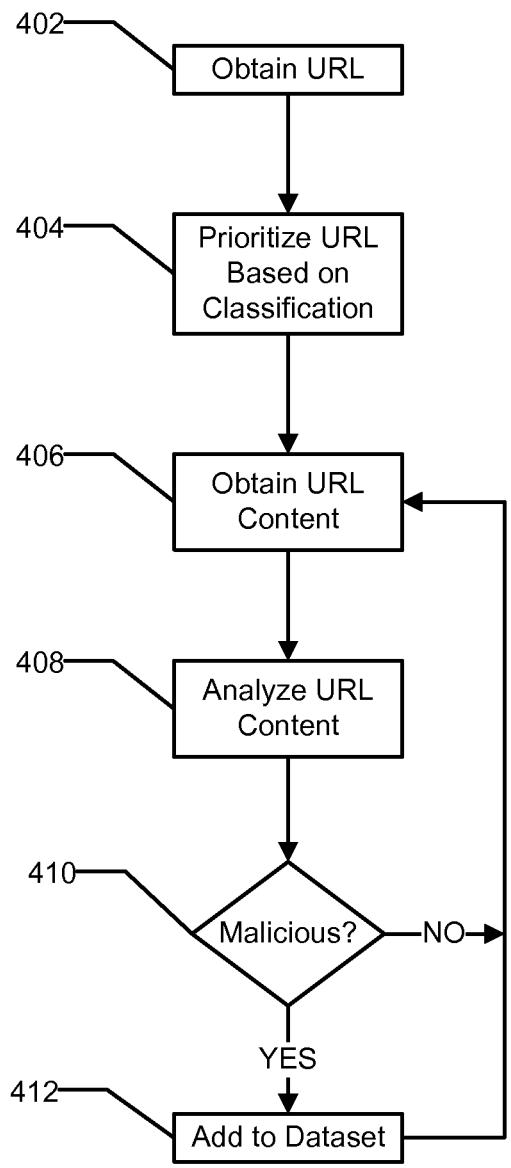
FIG. 4 is a flow diagram illustrating an exemplary method of determining if a URL is malicious.

FIG. 4 illustrates an exemplary method of determining if a URL is malicious. At 402, the system can obtain a plurality of URLs and classifications for each of the URLs. The classification can be based on characteristics of the traffic pattern associated with the URL. At 404, the system can prioritize the URLs based on the classification. For example, URLs with a characterization indicative of a high probability of malicious content can have a higher priority than URLs with a classification indicative of a low probability of malicious content.

At 406, the system can obtain the content of the URL, and at 408, the system can analyze the content to determine if the content is malicious. For example, the content may be analyzed by malware detection software to determine if the content contains malware, such as a computer virus or worm. Alternatively, the content may be executed within a sandbox environment to determine the effect of the content without compromising the system. Additionally, the content can be analyzed to determine if the site is a phishing site.

At 410, the system can determine if the content is malicious. When the content is malicious, the URL can be added to a malicious URL database, as illustrated at 412, and the system can obtain the content of a next URL, as illustrated at 406. Alternatively, when the content is not determined to be malicious, the system can obtain the content of a next URL, as illustrated at 406 without adding the URL to a malicious URL database.

Figure 5:
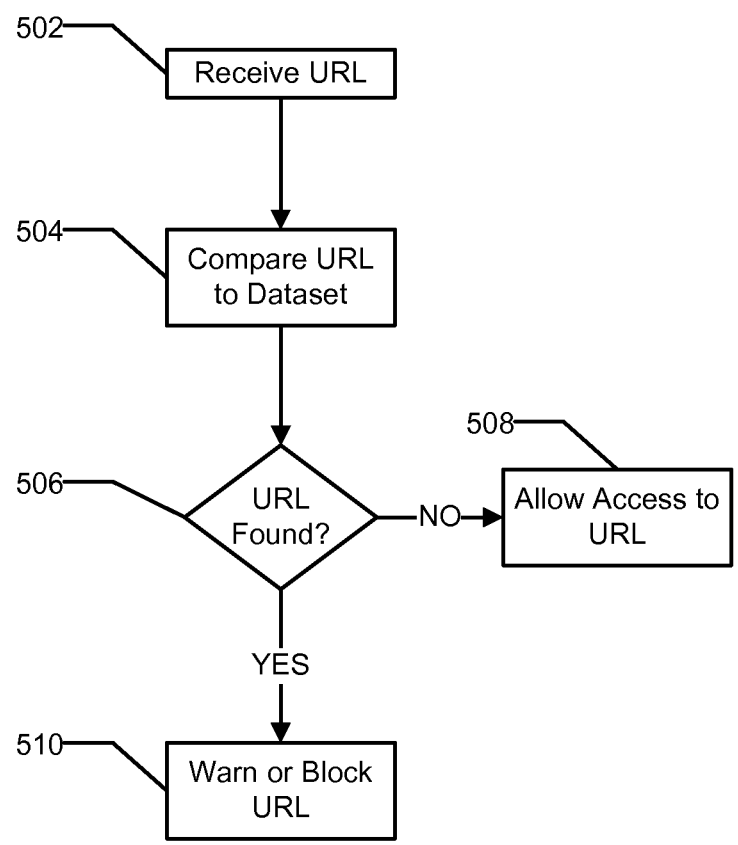
FIG. 5 is a flow diagram illustrating an exemplary method of protecting users from malicious URLs.

FIG. 5 illustrates an exemplary method for protecting against malicious URLs. At 502, a system can obtain a URL. The system can be a network device such as a firewall, web proxy, or router. Alternatively, the system can be a user system. At 504, the system can compare the URL to the URLs within a malicious URL database. At 506, the system can determine if the URL is found in the malicious URL database.

If the URL is not found in the malicious URL database, the system can allow access to the URL, as illustrated at 508. Alternatively, if the URL is found in the malicious URL database, the system can provide a warning to the user, such as by displaying a warning message or redirecting the user to a website with a warning massage. The warning message may indicate the URL contains malicious content, and may indicate the type of malicious content, such as a potential phishing site, malware, or other forms of malicious content. In an embodiment, the warning may provide the user with a way to access the content of the URL by acknowledging the warning and proceeding to the URL anyway. Alternatively, the system can substantially prevent access to the URL, such as by displaying a message or redirecting the user to a website indicating that access to the URL is prohibited due to the malicious content.

Figure 6:
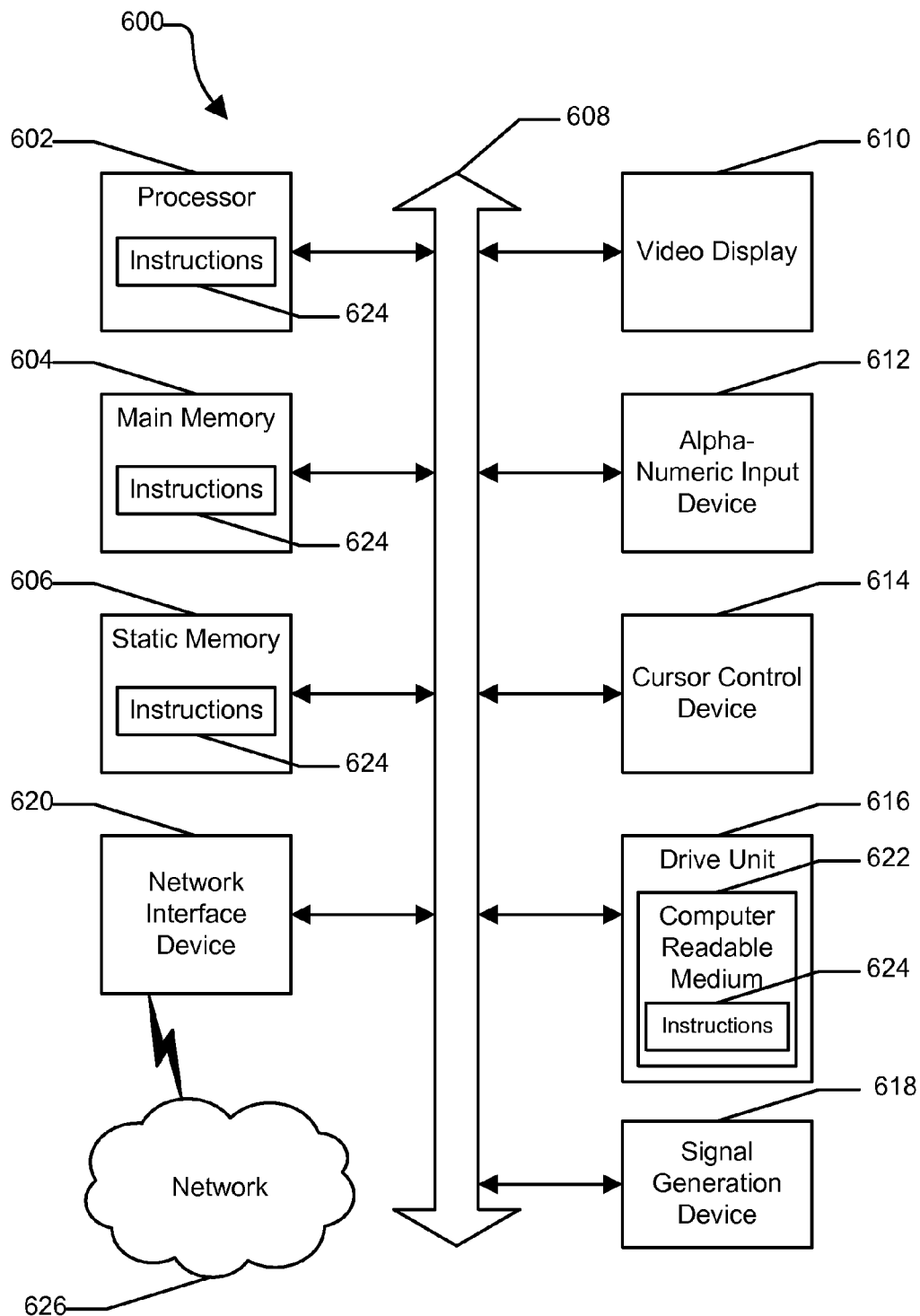
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid-state display, or a cathode ray tube (CRT). Additionally, the computer system 600 may include an input device 612 such as a keyboard, and a cursor control device 614 such as a mouse. Alternatively, input device 612 and cursor control device 614 can be combined in a touchpad or touch sensitive screen. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A computer implemented method comprising:
identifying a destination universal resource locator;
identifying a referring universal resource locator that referred the destination universal resource locator;
characterizing, by utilizing a processor that executes instructions stored in memory, a traffic pattern associated with the destination universal resource locator as indicative of malicious content, wherein the traffic pattern is characterized based on information about the referring universal resource locator;
classifying the destination universal resource locator into a risk category based on characterizing the traffic pattern;
prioritizing a plurality of destination universal resource locators for malicious content analysis based on classifying each destination universal resource locator into a risk category; and
determining if content associated with an analyzed destination universal resource locator is malicious;
wherein the information about the referring universal resource locator comprises popularity information of the referrin universal resource locator and;
wherein the popularity information of the referring universal resource locator includes an indication that the referring universal resource locator is indexed by a search engine.

2. The computer implemented method of claim 1, wherein the classifying the destination universal resource locator into a risk category is based on multiple aspects of the traffic pattern.

3. The computer implemented method of claim 1, further comprising analyzing content associated with the destination universal resource locator to determine if the content is malicious.

4. The computer implemented method of claim 1, further comprising blocking the destination universal resource locator based on a determination that the content associated with the destination universal resource locator is malicious.

5. A system comprising:
a memory that stores instructions;
a processor that executes the instructions to perform operations comprising: obtaining click stream information for a plurality of user systems;
identifying a destination universal resource locator accessed by a user system of the plurality of user systems;
identifying a referring universal resource locator that referred the destination universal resource locator;
characterizing a traffic pattern associated with the destination universal resource locator as indicative of malicious content based on the click stream information, wherein the traffic pattern is characterized based on information about the referring universal resource locator;
classifying the destination universal resource locator into a risk category based on characterizing the traffic pattern;
prioritizing a plurality of destination universal resource locators for malicious content analysis based on classifying each destination universal resource locator into a risk category; and
determining if content associated with an analyzed destination universal resource locator is malicious;
wherein the information about the referring universal resource locator comprises popularity information of the referring universal resource locator and;
wherein the popularity information of the referring universal resource locator includes an indication that the referring universal resource locator is indexed by a search engine.

6. The system of claim 5, wherein the classifying the destination universal resource locator into a risk category is based on multiple aspects of the traffic pattern.

7. The system of claim 5, wherein the operations further comprise analyzing content associated with the destination universal resource locator to determine if the content is malicious.

8. The system of claim 5, wherein the operations further comprise blocking the destination universal resource locator based on a determination that the content associated with the destination universal resource locator is malicious.

9. A machine readable storage device comprising computer instructions, which, when executed by a processor, cause the processor to perform operations comprising:
obtaining click stream information for a plurality of user systems;
identifying a destination universal resource locator accessed by at a user system of the plurality of user systems;
identifying a referring universal resource locator that referred the destination universal resource locator;
characterizing a traffic pattern associated with the destination universal resource locator as indicative of malicious content based on the click stream information, wherein the traffic pattern is characterized based on information about the referring universal resource locator;
classifying the destination universal resource locator into a risk category based on characterizing the traffic pattern;
prioritizing a plurality of destination universal resource locators for malicious content analysis based on classifying each destination universal resource locator into a risk category; and
determining if content associated with an analyzed destination universal resource locator is malicious;
wherein the information about the referring universal resource locator comprises popularity information of the referring universal resource locator and;
wherein the popularity information of the referring universal resource locator includes an indication that the referring universal resource locator is indexed by a search engine.

10. The machine readable storage device of claim 9, wherein the classifying the destination universal resource locator into a risk category is based on multiple aspects of the traffic pattern.

* * * * *